(12) United States Patent
Hayashi et al.

(10) Patent No.: US 8,371,114 B2
(45) Date of Patent: Feb. 12, 2013

(54) EXHAUST GAS PURIFICATION APPARATUS FOR INTERNAL COMBUSTION ENGINE

(75) Inventors: Miwa Hayashi, Saitama (JP); Takeshi Miyamoto, Saitama (JP); Fumiyasu Kurogi, Saitama (JP)

(73) Assignee: Bosch Corporation, Tokyo (JP)

( * ) Notice: Subject to any disclaimer, the term of this patent is extended or adjusted under 35 U.S.C. 154(b) by 286 days.

(21) Appl. No.: 12/530,816

(22) PCT Filed: Oct. 16, 2007

(86) PCT No.: PCT/JP2007/070121
§ 371 (c)(1),
(2), (4) Date: Sep. 11, 2009

(87) PCT Pub. No.: WO2008/111254
PCT Pub. Date: Sep. 18, 2008

(65) Prior Publication Data
US 2010/0083643 A1      Apr. 8, 2010

(30) Foreign Application Priority Data
Mar. 12, 2007  (JP) ................................. 2007-061561

(51) Int. Cl.
*F01N 1/00* (2006.01)
*F01N 3/00* (2006.01)
*F01N 3/02* (2006.01)
*F01N 3/10* (2006.01)

(52) U.S. Cl. .................. 60/317; 60/286; 60/295; 60/324

(58) Field of Classification Search ............ 60/286, 60/295, 303, 317, 324
See application file for complete search history.

(56) References Cited

U.S. PATENT DOCUMENTS

| 6,444,177 | B1 | 9/2002 | Muller et al. |
| 6,620,391 | B2 * | 9/2003 | Muller et al. ................. 423/210 |
| 7,152,396 | B2 * | 12/2006 | Cheng ............................. 60/286 |

FOREIGN PATENT DOCUMENTS

| EP | 1770253 A1 | 4/2007 |
| JP | 10511038 A | 10/1998 |

(Continued)

OTHER PUBLICATIONS

Machine Translation JP 2006-132393.*

*Primary Examiner* — Kenneth Bomberg
*Assistant Examiner* — Dapinder Singh
(74) *Attorney, Agent, or Firm* — Michael Best & Friedrich LLP

(57) ABSTRACT

The invention provides an exhaust gas purification apparatus for an internal combustion engine which evenly diffuses a reducing agent over an entirety of the exhaust gas which flows into an $NO_x$ catalyst disposed on the downstream side of thereof. The exhaust gas purification apparatus includes an $NO_x$ catalyst disposed in an exhaust gas passage of an internal combustion engine, and a reducing agent injecting unit for injecting the reducing agent into the exhaust gas passage which is on an upstream side of the $NO_x$ catalyst. A narrowed portion, in which a cross-sectional area of a flow passage is smaller than a cross-sectional area of the exhaust gas passage and of the $NO_x$ catalyst, is provided on a downstream side of an injecting position by the reducing agent injecting unit and the upstream side of the $NO_x$ catalyst, and a reducing agent diffusing device is provided on the narrowed portion.

12 Claims, 17 Drawing Sheets

FOREIGN PATENT DOCUMENTS

| | | | |
|---|---|---|---|
| JP | 2002213233 A | 7/2002 | |
| JP | 2005155404 A | 6/2005 | |
| JP | 200629233 A | 2/2006 | |
| JP | 2006-132393 | * | 5/2006 |
| JP | 2006132393 A | | 5/2006 |
| JP | 2006336588 A | | 12/2006 |

* cited by examiner

WITHIN THE REDUCTANT
DIFFUSING MEANS
AND THE AREA IS MAXIMUM

WITHIN THE REDUCTANT
DIFFUSING MEANS
BUT THE AREA IS SMALLER

OUTSIDE THE REDUCTANT
DIFFUSING MEANS
AND THE AREA IS SMALLER

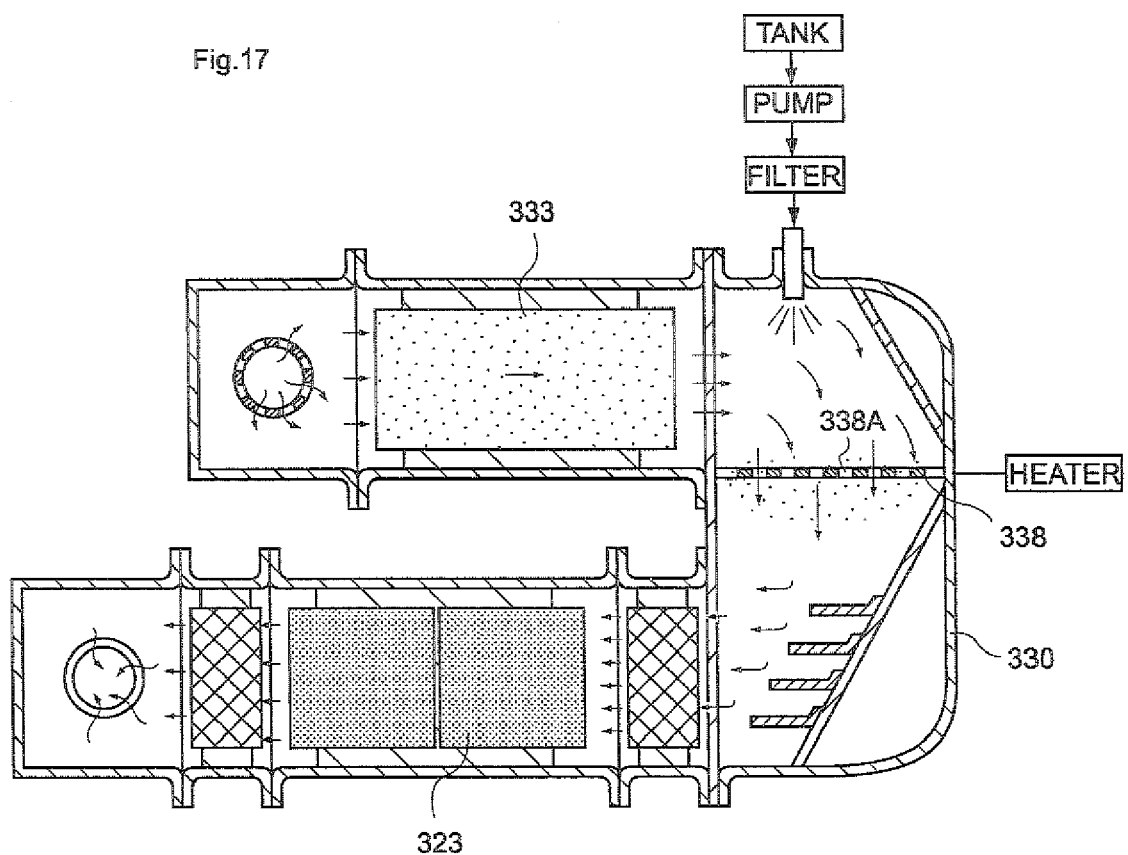

EXHAUST GAS PURIFICATION APPARATUS FOR INTERNAL COMBUSTION ENGINE

TECHNICAL FIELD

The present invention relates to an internal combustion engine exhaust gas purification apparatus. More particularly, the invention relates to an internal combustion engine exhaust gas purification apparatus provided with a selective catalytic reduction-type $NO_x$ catalyst for reducing and removing $NO_x$ in the exhaust gas using a reducing agent.

BACKGROUND ART

Conventionally, techniques for removing particulate matter (hereinafter referred to as "PM") and nitrogen oxide (hereinafter referred to as "$NO_x$") contained in the exhaust gas exhausted from an internal combustion engine such as a diesel engine have been known.

Among the techniques, a selective catalytic reduction-type (SCR) exhaust gas purification apparatus is known as a technique for removing $NO_x$. In the SCR-type exhaust gas purification apparatus, a reducing agent and an exhaust gas are mixed by injecting the reducing agent into an exhaust gas passage on the upstream side of an $NO_x$ catalyst. Then, the mixture of the reducing agent and the exhaust gas is passed through the $NO_x$ catalyst so that the $NO_x$ (such as NO and $NO_2$) in the exhaust gas can be efficiently decomposed into nitrogen ($N_2$) and the like, and the resulting exhaust gas is emitted.

One example of such a selective catalytic reduction-type exhaust gas purification apparatus is shown in FIG. 16. The exhaust gas purification apparatus 310 has an $NO_x$ catalyst 313 disposed in an exhaust gas passage 311, a reducing agent injecting device 315 for injecting a reducing agent into the exhaust gas passage 311 on the upstream side of the $NO_x$ catalyst 313, and upstream-side oxidation catalysts 317 and downstream-side oxidation catalysts 319.

In this exhaust gas purification apparatus 310, a urea aqueous solution injected into the exhaust gas as a reducing agent undergoes hydrolysis, whereby ammonia ($NH_3$) is produced. The $NH_3$ and the $NO_x$ react with each other in the $NO_x$ catalysts so that they are decomposed into nitrogen ($N_2$) and ($H_2O$), and the resulting exhaust gas is emitted to outside.

In such an exhaust gas purification apparatus, it has been demanded to diffuse the reducing agent efficiently in the exhaust gas that flows into the $NO_x$ catalyst, and for that purpose, an exhaust gas purification apparatus in which a perforated plate is disposed at the entrance of the $NO_x$ catalyst has been proposed. More specifically, an exhaust gas purification apparatus as shown in FIG. 17 is disclosed (see Patent Document 1). In the exhaust gas purification apparatus, a DPF 333 and a urea $NO_x$ removal catalyst 323 are disposed in parallel (the flow of the exhaust gas is in-line). These are allowed to communicate with each other by a communication chamber 330, and the entire apparatus is formed in an angular U-shape. Also, a perforated plate 338 in which a large number of holes 338A are drilled is disposed at a mid position along the exhaust gas flow direction in an upstream-side communication chamber 330 of the urea $NO_x$ removal catalyst 323.

Patent Document 1: JP-A-2005-155404 (Paragraphs [0038] to [0039], FIG. 1)

DISCLOSURE OF THE INVENTION

Problems that the Invention is to Solve

However, with the exhaust gas purification apparatus disclosed in Patent Document 1, the reducing agent may not be diffused uniformly when the flow rate of the exhaust gas is slow, although the perforated plate is disposed in a mid portion of the exhaust gas flow direction. That is, when the flow rate of the exhaust gas is slow, the reducing agent cannot be diffused uniformly over the entirety of the exhaust gas and the distribution of the reducing agent may become non-uniform, although the reducing agent is atomized by being sprayed from the reducing agent injection valve and it is evaporated and diffused by the heat from the perforated plate.

In view of this, the inventors of this invention have found that such problems can be solved by providing a narrowed portion in which the cross-sectional area of the flow passage is made small on the upstream side of the $NO_x$ catalyst and providing reducing agent diffusing means on the narrowed portion, and thus have completed this invention.

Accordingly, it is an object of the invention to provide an internal combustion engine exhaust gas purification apparatus that can make the exhaust gas in which a reducing agent is diffused uniformly over the entirety flow into an $NO_x$ catalyst disposed on the downstream side.

Means for Solving the Problems

The invention can solve the foregoing problems by providing an internal combustion engine exhaust gas purification apparatus comprising an $NO_x$ catalyst disposed in an exhaust gas passage of an internal combustion engine, and a reducing agent injecting unit for injecting a reducing agent into the exhaust gas passage that is on an upstream side of the $NO_x$ catalyst, the internal combustion engine exhaust gas purification apparatus being characterized in that a narrowed portion in which the cross-sectional area of a flow passage is smaller than the cross-sectional area of the exhaust gas passage and that of the $NO_x$ catalyst is provided on a downstream side of an injecting position by the reducing agent injecting unit and the upstream side of the $NO_x$ catalyst, and that a reducing agent diffusing means is provided on the narrowed portion.

In configuring the exhaust gas purification apparatus of the invention, it is preferable that a guide portion for guiding the exhaust gas to the $NO_x$ catalyst is provided between the narrowed portion and the $NO_x$ catalyst.

In configuring the exhaust gas purification apparatus of the invention, it is preferable that the guide portion is an expanding pipe the cross-sectional area which expands toward the downstream side.

In configuring the exhaust gas purification apparatus of the invention, it is preferable that the exhaust gas passage is curved in the upstream side of the $NO_x$ catalyst, and that the guide portion is fitted so as to cover an entrance of the $NO_x$ catalyst at a curved location and is provided with an exhaust gas inlet at a portion thereof, so that the flow direction of the exhaust gas that flows from the exhaust gas inlet into the guide portion changes along the direction in which the exhaust gas passage curves.

In configuring the exhaust gas purification apparatus of the invention, it is preferable that the reducing agent injecting unit is disposed so that the injecting direction of the reducing agent is directed toward the reducing agent diffusing means.

In configuring the exhaust gas purification apparatus of the invention, it is preferable that the reducing agent injecting unit is disposed so that the injection area of the injected reducing agent when reaching the narrowed portion does not spread outside the reducing agent diffusing means.

Advantageous Effects of the Invention

According to the internal combustion engine exhaust gas purification apparatus of the invention, the flow rate of the exhaust gas passing through the reducing agent diffusing means can be increased because the reducing agent diffusing means is provided at the narrowed portion of the exhaust gas passage. Therefore, by the reducing agent diffusing means, the reducing agent injected by the reducing agent injecting unit is encouraged to evaporate, and moreover, it is diffused and mixed in the exhaust gas efficiently. As a result, the exhaust gas in which the reducing agent is diffused uniformly flows into the $NO_x$ catalyst, increasing the reduction efficiency of the $NO_x$.

In addition, the internal combustion engine exhaust gas purification apparatus of the invention is furnished with a guide portion between the narrowed portion and the $NO_x$ catalyst. As a result, The exhaust gas in which the reducing agent is diffused and mixed can be guided into the $NO_x$ catalyst efficiently, and the reducing agent can be allowed to flow into the $NO_x$ catalyst efficiently.

Furthermore, in the internal combustion engine exhaust gas purification apparatus of the invention, the exhaust gas is guided from the narrowed portion to the $NO_x$ catalyst by the expanding pipe. Therefore, the reducing agent diffused in the exhaust gas can be allowed to flow to the entire surface of the $NO_x$ catalyst efficiently.

In addition, in the internal combustion engine exhaust gas purification apparatus of the invention, the guide portion for changing the flow direction of the exhaust gas along the curved portion is provided. Thereby, the reducing agent diffusing means can be disposed at the narrowed portion while the degree of freedom in the layout of the exhaust gas passage is ensured.

In the internal combustion engine exhaust gas purification apparatus of the invention, the reducing agent is injected from the reducing agent injecting unit toward the reducing agent diffusing means. Thereby, the injected reducing agent can be atomized more efficiently by utilizing the heat quantity retained by the reducing agent diffusing means.

In the internal combustion engine exhaust gas purification apparatus of the invention, the reducing agent injecting unit is disposed so that the injection area of the reducing agent does not spread outside the reducing agent diffusing means. As a result, it is possible to prevent the reducing agent from adhering and crystallizing at the location other than the reducing agent diffusing means.

BRIEF DESCRIPTION OF THE DRAWINGS

FIG. 17 is a view for illustrating the configuration of another conventional internal combustion engine exhaust gas purification apparatus.

BEST MODE FOR CARRYING OUT THE INVENTION

Figure 1:
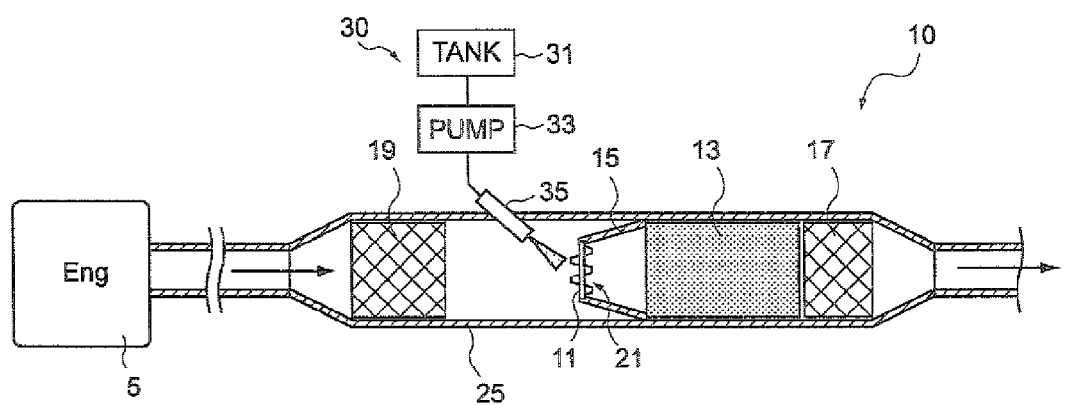
FIG. 1 is a view for illustrating the configuration of an internal combustion engine exhaust gas purification apparatus according to an embodiment.

Hereinbelow, embodiments of an internal combustion engine exhaust gas purification apparatus according to the invention will be described in detail with reference to the drawings. It should be noted, however, that such embodiments are merely illustrative and not limiting of the invention, and various modifications may be made within the scope of the invention.

It should be noted that same members are denoted by same reference numerals, and the description thereof may be omitted as appropriate.

1. Exhaust Gas Purification Apparatus

FIG. 1 shows a cross-sectional view of an internal combustion engine exhaust gas purification apparatus (hereinafter simply referred to as an "exhaust gas purification apparatus") 10 according to an embodiment of the invention.

The exhaust gas purification apparatus 10 according to this embodiment has an internal combustion engine 5 that emits exhaust gas, an exhaust pipe 25 that is connected to the internal combustion engine 5, an $NO_x$ catalyst 13 that is connected at a middle portion of the exhaust pipe 25, and a reducing agent supply device 30 that injects a reducing agent into an exhaust gas passage at an upstream side of the $NO_x$ catalyst 13. An upstream-side oxidation catalyst 19 and a downstream-side oxidation catalyst 17 are disposed respectively on the upstream side and the downstream side of the $NO_x$ catalyst 13.

Among these, the internal combustion engine 5 is typically a diesel engine or a gasoline engine. However, it is appropriate that the exhaust gas purification apparatus is targeted at a diesel engine, in which the degree of purification of PM and $NO_x$ in the exhaust gas is problematic under the current circumstances.

The reducing agent supply device 30 has a storage tank 31 for the reducing agent, a pump 33 for pumping the reducing agent in the storage tank 31, and a reducing agent injection valve 35 for injecting the reducing agent into an exhaust gas passage. An electric pump, for example, is used for the pump 33. The pump 33 is controlled so that the pressure in a reducing agent supply passage 37 is kept at a predetermined pressure. The reducing agent injection valve 35 is, for example, an ON-OFF valve in which the on/off of the opening is controlled by, for example, duty control. The reducing agent injection valve 35 is fitted to the exhaust pipe 25 on the upstream side of the $NO_x$ catalyst 13 so that an injection hole 35a thereof faces toward the interior of the exhaust gas passage.

The amount of the reducing agent injected by the reducing agent supply device 30 is determined according to the amount of $NO_x$ to be exhausted that is estimated based on the rotational frequency and load condition of the internal combustion engine 5, the fuel injection amount, and the like, and according to this injection amount, the duty control of the reducing agent injection valve 35 is performed. It should be noted, however, that the configuration of the reducing agent supply device 30 shown in FIG. 1 is merely illustrative and not particularly limiting. For example, it is also possible to use an air-assist type reducing agent supply device.

A typical reducing agent used is a urea aqueous solution. For example, in the case where the urea aqueous solution is used, the urea injected into the exhaust gas passage undergoes hydrolysis by the heat within the exhaust gas to thereby produce ammonia ($NH_3$). This $NH_3$ reacts with the $NO_x$ (NO and $NO_2$) in the exhaust gas inside the $NO_x$ catalyst. Thereby, the $NO_x$ is reduced and decomposed into nitrogen ($N_2$) and water ($H_2O$), and the resulting exhaust gas is emitted.

Apart from this, a material that can reduce $NO_x$, such as hydrocarbon (HC), can be used as a liquid reducing agent.

The $NO_x$ catalyst 13 used for the exhaust gas purification apparatus 10 of this embodiment is a selective catalytic reduction-type $NO_x$ catalyst, which selectively reduces and purifies the $NO_x$ contained in the exhaust gas. It is possible to use a known $NO_x$ catalyst for the $NO_x$ catalyst 13, such as the one in which an alkaline earth metal such as strontium, barium, or magnesium, a rare-earth metal such as cerium or lanthanum, or a noble metal such as platinum and rhodium is contained as the catalytic component on a porous carrier.

In the exhaust gas purification apparatus 10 of this embodiment, an expanding pipe that is made of a metallic material that is the same as the exhaust pipe 25 and whose cross-sectional area gradually increases toward the downstream side is connected on the upstream side of the $NO_x$ catalyst 13. The expanding pipe provided in the exhaust gas purification apparatus 10 shown in FIG. 1 is made of a tapered pipe 15 shown in FIG. 2(a). It is formed into a narrowed portion 21 whose entrance portion (upstream-side end) 15a is formed to have an area smaller than the cross-sectional area of the $NO_x$ catalyst and the exhaust pipe.

Figure 2:
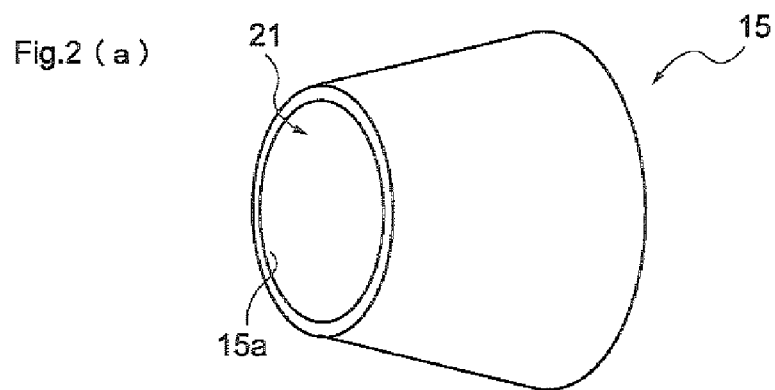
FIG. 2 shows views illustrating examples of the configuration of a tapered pipe having a narrowed portion.
Figure 2:
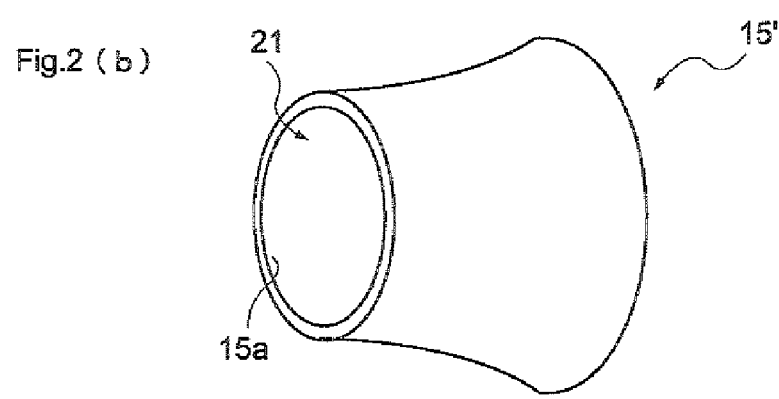
Figure 2:
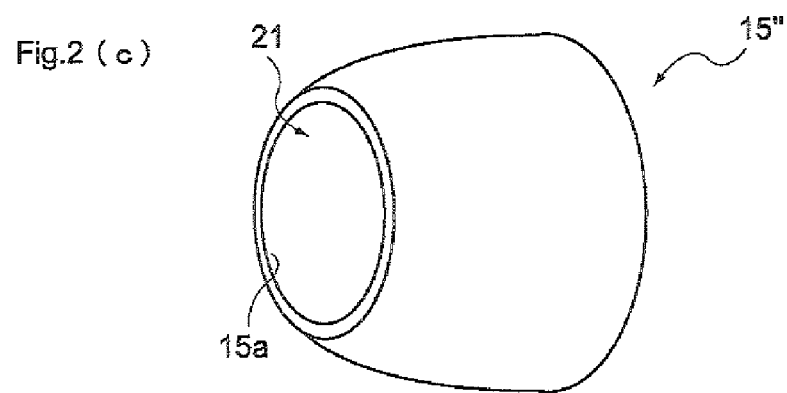

Other than the tapered pipe 15 shown in FIG. 2(a), this expanding pipe may be an expanding pipe 15' or 15" that has a configuration as illustrated in FIG. 2(b) or 2(c).

In addition, as shown in FIG. 1, reducing agent diffusing means 11 is disposed on the narrowed portion 21 so that the reducing agent injected into the exhaust gas can be diffused uniformly in the exhaust gas when the exhaust gas passes through the reducing agent diffusing means 11. In particular, since the reducing agent diffusing means 11 is disposed on the narrowed portion 21, the flow rate of the exhaust gas flowing in the exhaust gas passage is increased when the exhaust gas passes through the narrowed portion 21, so the diffusion effect of the reducing agent diffusing means 11 is enhanced. Moreover, the tapered pipe 15 also functions as a guide portion for guiding the exhaust gas that has passed through the narrowed portion 21 to the $NO_x$ catalyst 13, so as to allow the reducing agent that has been diffused uniformly in the exhaust gas to flow into the $NO_x$ catalyst 13 efficiently.

As long as the reducing agent diffusing means 11 disposed on the narrowed portion 21 can generate a vortex flow or a turbulent flow with the flow of the exhaust gas in which the reducing agent is mixed, any type of reducing agent diffusing means may be used.

In the case that the reducing agent diffusing means 11 is formed using a metallic material having a high thermal conductivity, such as stainless steel or aluminum, evaporation of the reducing agent injected in the exhaust gas is promoted by the reducing agent diffusing means 11 heated by the exhaust gas, so the reducing agent can be diffused in the exhaust gas efficiently. As a result, the reducing agent can easily diffuse uniformly over the entire exhaust gas.

Figure 3:
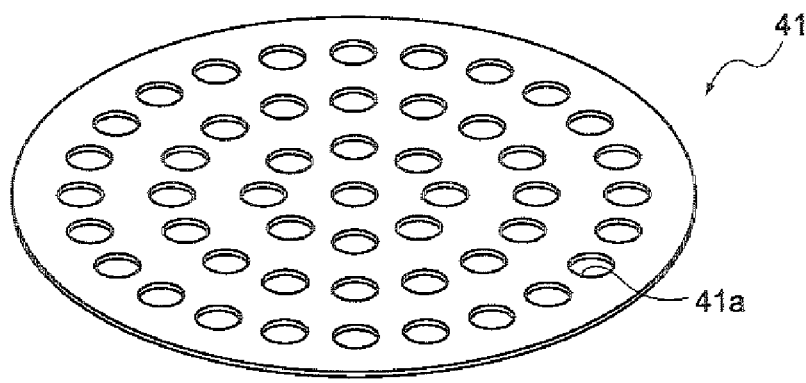
FIG. 3 shows views illustrating examples of the configuration of reducing agent diffusing means.
Figure 3:
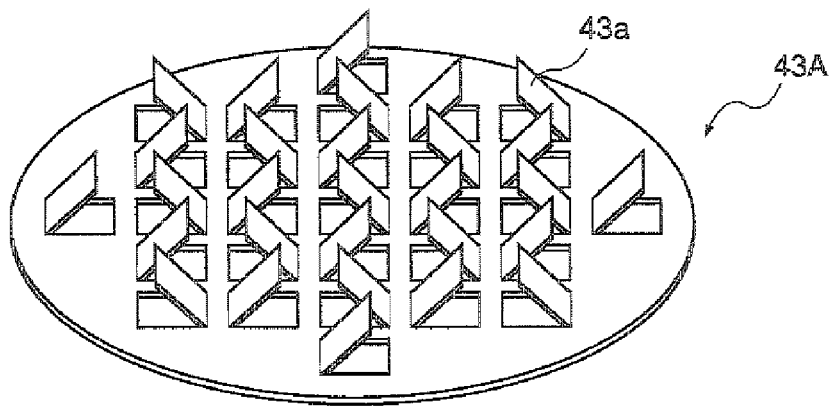
Figure 3:
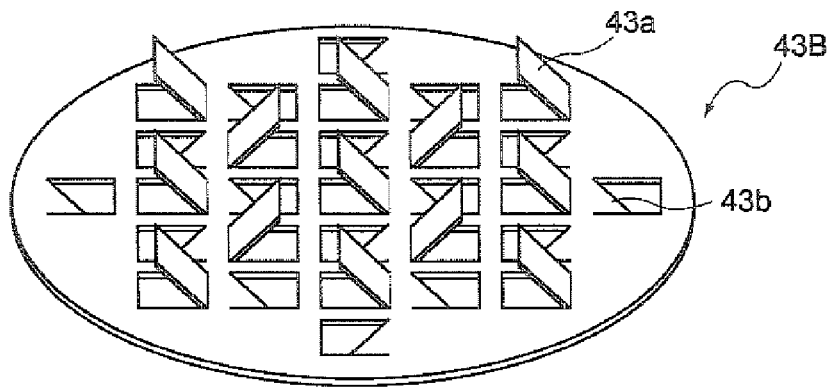
Figure 4:
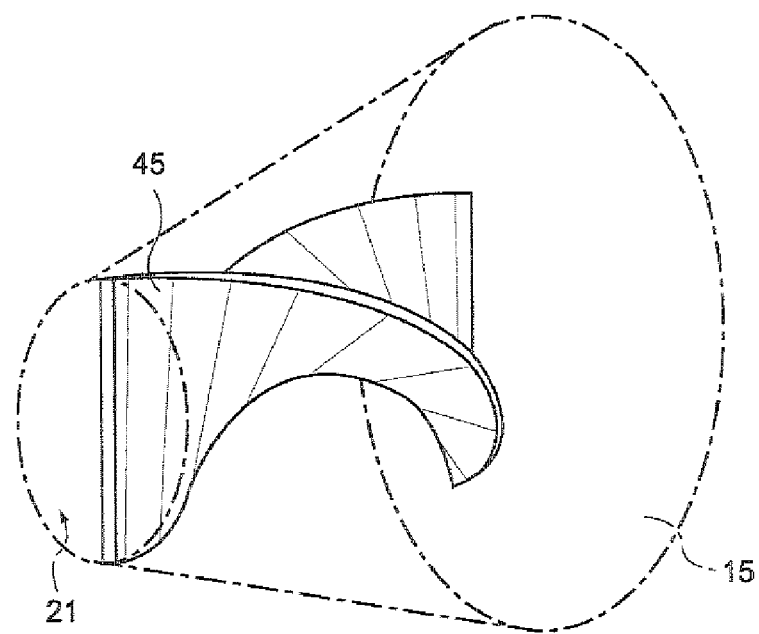
FIG. 4 shows views illustrating other examples of the configuration of reducing agent diffusing means.
Figure 4:
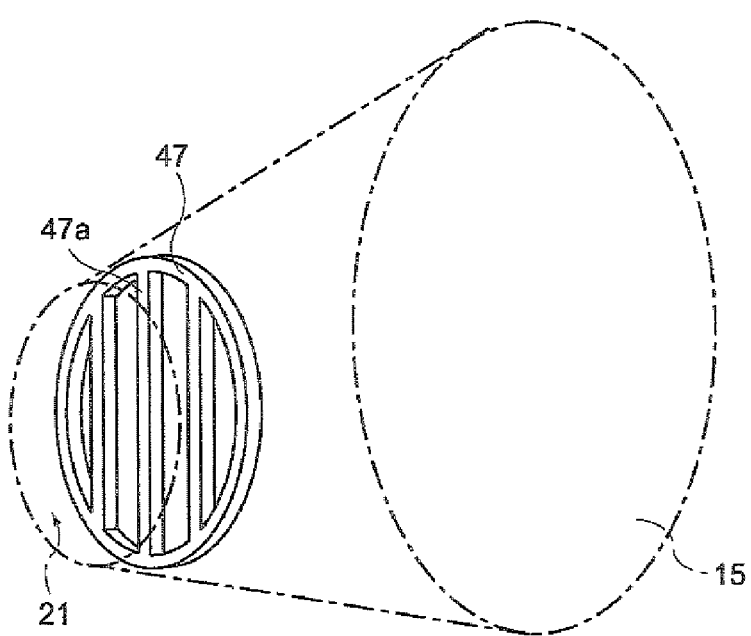

One example of the reducing agent diffusing means 11 disposed on the narrowed portion 21 is shown in each of FIGS. 3 to 4.

FIG. 3(a) shows a perforated plate 41 in which a multiplicity of holes 41a are drilled. FIGS. 3(b) and 3(c) respectively show mixers 43A and 43B each having a plurality of flaps formed by cutting and raising portions of the plate. In FIG. 3(b), all the flaps 43a are cut and raised from the same face, and in FIG. 3(c), a plurality of flaps 43a and 43b are cut and raised from respective faces.

FIG. 4(a) shows an example in which a swirl type static mixer 45 in which a swirl passage is formed by twisting one plate is disposed on the narrowed portion 21. Further, as shown in FIG. 4(b), a plurality of reducing agent colliding parts 47a are formed in portions of the narrowed portion 21, so as to form the reducing agent diffusing means 47.

The reducing agent diffusing means shown in FIGS. 3(a) to 3(c) and FIGS. 4(a) and 4(b) may be used either alone or in combination.

Figure 5:
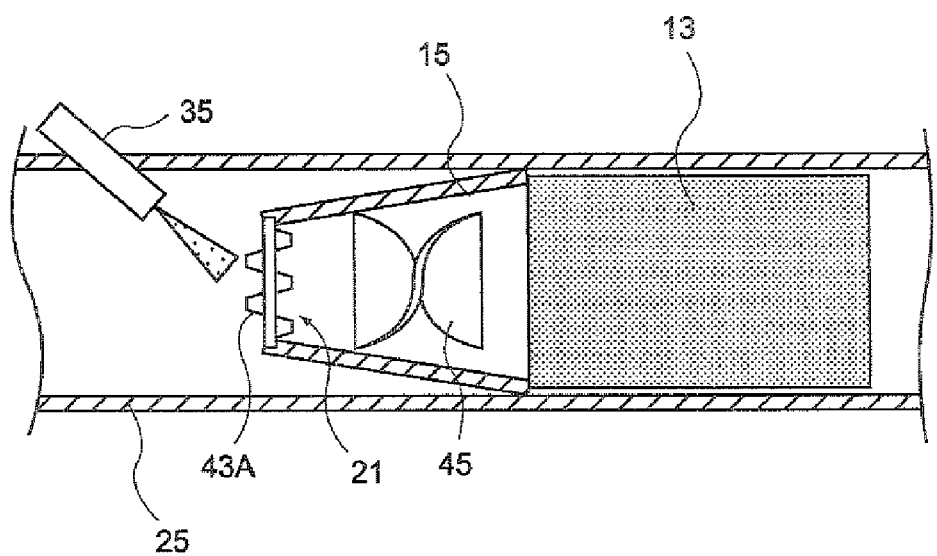
FIG. 5 is a view illustrating a configuration example in which a plurality of reducing agent diffusing means are provided.

FIG. 5 shows an example in which the mixer 43A having a plurality of flaps is disposed on the narrowed portion 21 of the tapered pipe 15 and also the swirl type static mixer 45 is disposed on the downstream side from the narrowed portion 21 of the tapered pipe 15. In the example of FIG. 5, the injected reducing agent is atomized by being passed through the mixer 43A disposed on the narrowed portion 21, and also, a relatively small vortex flow is produced, so mixing of the reducing agent with the exhaust gas is promoted. Thereafter, the reducing agent mixed with the exhaust gas passes through the static mixer 45, and thereby a large vortex flow is produced, so the distribution of the reducing agent is made uniform.

Moreover, as shown in FIG. 1, in the exhaust gas purification apparatus 10 of this embodiment, the reducing agent injection valve 35 is disposed so that the injecting direction thereof is directed toward the reducing agent diffusing means 11, and the injected reducing agent advances toward the reducing agent diffusing means 11. Therefore, the reducing agent is directly blown onto the reducing agent diffusing means 11, and the atomization of the reducing agent by evaporation is further promoted.

Figure 6:
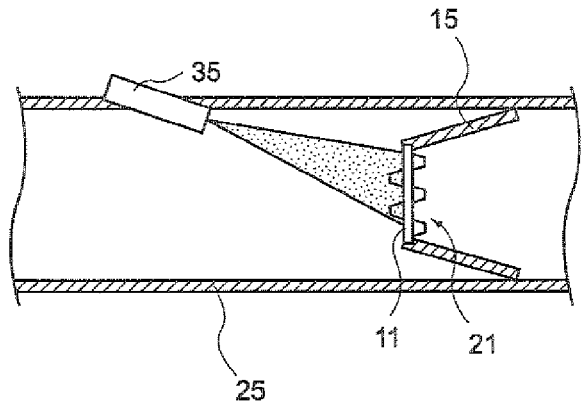
FIG. 6 shows views for illustrating the arrangement positions of a reducing agent injection valve.
Figure 6:
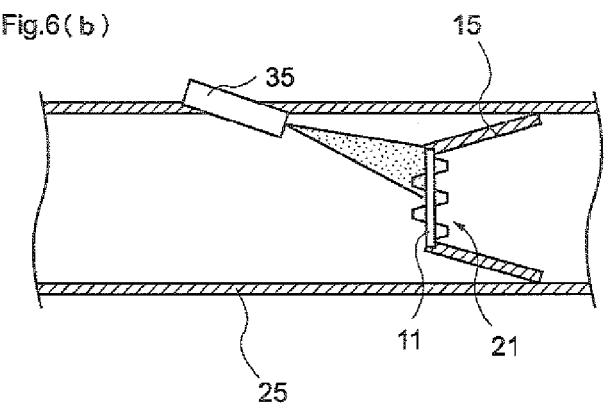
Figure 6:
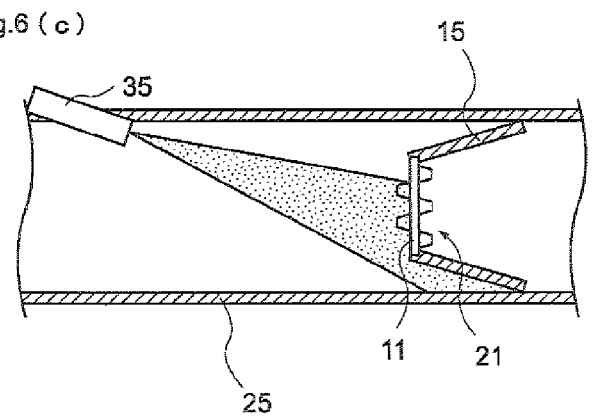

In addition, it is preferable that the reducing agent injection valve 35 is disposed so that the injection area of the injected reducing agent when reaching the narrowed portion 21 does not spread outside the reducing agent diffusing means 11, as shown in FIGS. 6(a) and 6(b). More preferably, the reducing agent injection valve 35 should be disposed at such a location that the injection area of the injected reducing agent when reaching the reducing agent diffusing means 11 becomes maximum, as shown in FIG. 6(a).

When the reducing agent injection valve 35 is disposed in this way, the atomization and diffusion effect of the reducing agent can be maximized, and at the same time, it is possible to reduce the possibility that the reducing agent crystallizes by adhering to the location other than the narrowed portion 21, which serves as the passage to the $NO_x$ catalyst 13 side.

Figure 7:
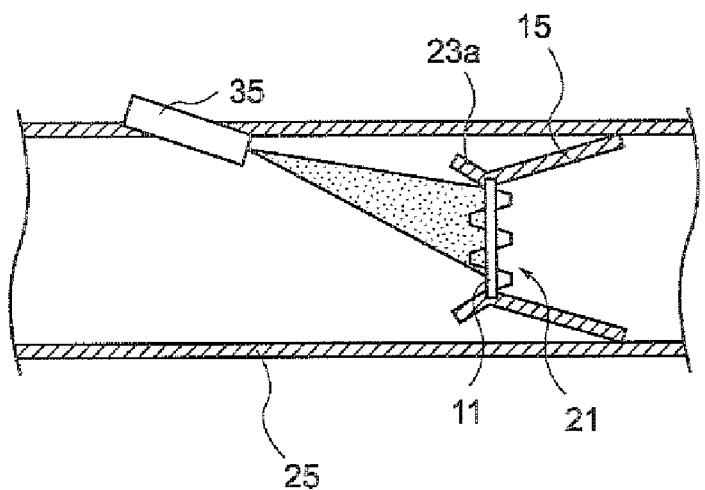
FIG. 7 shows views illustrating examples of the configuration in which an upstream-side guide portion is provided on the upstream side of the narrowed portion.
Figure 7:
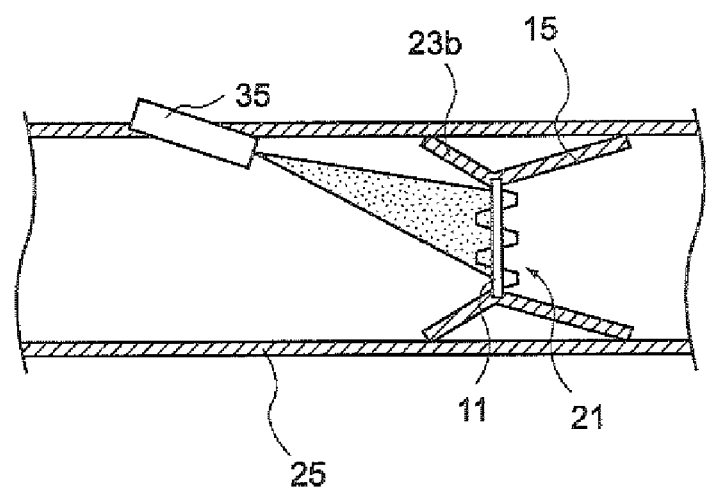

In order to prevent the reducing agent from crystallizing by adhering to the location other than the narrowed portion that serves as the passage to the $NO_x$ catalyst side, it is also possible to provide an upstream-side guide portion 23a or 23b on the upstream side of the narrowed portion 21, as shown in FIGS. 7(a) and 7(b), respectively. Each of the guide portions 23a and 23b is disposed on the upstream side of the narrowed portion 21, and it is configured so that the cross-sectional area of the exhaust gas passage becomes smaller toward the narrowed portion 21.

When such an upstream-side guide portion is provided, the flow rate of the exhaust gas guided to the narrowed portion 21 is increased. As a result, the injected reducing agent is prevented from adhering to the location other than the reducing agent diffusing means 11 while the injected reducing agent is allowed to flow into the reducing agent diffusing means 11.

In addition, the exhaust gas purification apparatus 10 of this embodiment has oxidation catalysts 17 and 19 (hereinafter referred to as an upstream-side oxidation catalyst and a downstream-side oxidation catalyst) on the upstream side and the downstream side of the $NO_x$ catalyst 13. Even if the ammonia produced from the urea aqueous solution as the reducing agent that has undergone hydrolysis slips and passes through the $NO_x$ catalyst 13 as it is, the ammonia can be oxidized and changed into $NO_2$, which is comparatively less harmful, by the downstream-side oxidation catalyst 17, so the resulting exhaust gas can be emitted, because the downstream-side oxidation catalyst 17 is provided.

Moreover, the upstream-side oxidation catalyst 19 can elevate the heat of the exhaust gas by oxidizing hydrocarbon (HC) and carbon monoxide (CO) contained in the exhaust gas, utilizing the heat of combustion. As a result, the exhaust gas that is brought into a comparatively high-temperature state is allowed to flow into the reducing agent diffusing means 11 and the $NO_x$ catalyst 13. Thus, the reducing agent diffusing means 11 can be heated, and the $NO_x$ catalyst 13 can be heated and activated. Moreover, it is also possible to adjust the ratio of the CO and $CO_2$ produced by oxidizing CO so that the reduction efficiency of the $NO_x$ in the $NO_x$ catalyst 13 can be optimized.

For the upstream-side oxidation catalyst 19 and the downstream-side oxidation catalyst 17, it is possible to use a known catalyst such as the one in which a predetermined amount of a rare-earth element such as cerium is added to platinum that is carried on alumina.

2. Modified Examples of the Configuration

The configuration of the exhaust gas purification apparatus of this invention is not limited to the one shown in FIG. 1, but various modifications are possible. For example, the configuration of the exhaust pipe varies depending on the vehicle or the like that incorporates the exhaust gas purification apparatus. FIGS. 8 through 14 hereinbelow show exhaust gas purification apparatus provided for the exhaust pipes that have different shapes.

Figure 8:
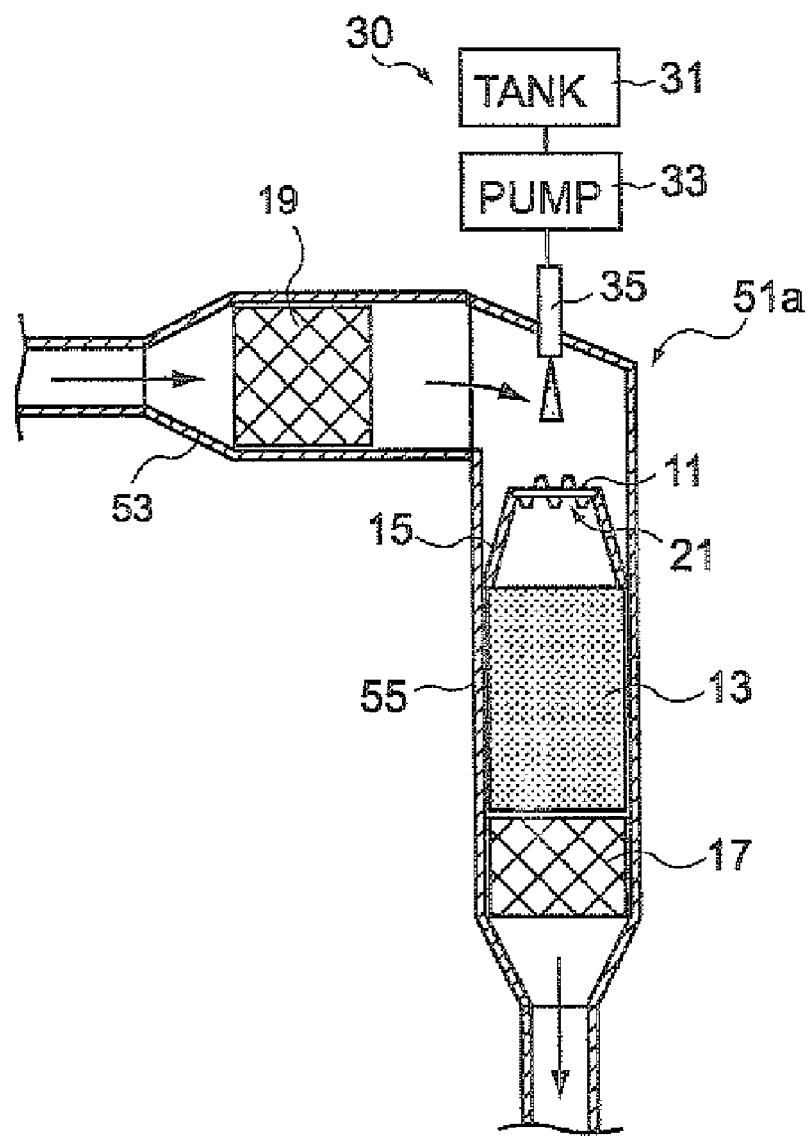
FIG. 8 is a view illustrating an example of the configuration of an internal combustion engine exhaust gas purification apparatus that utilizes an L-shaped exhaust pipe.
Figure 9:
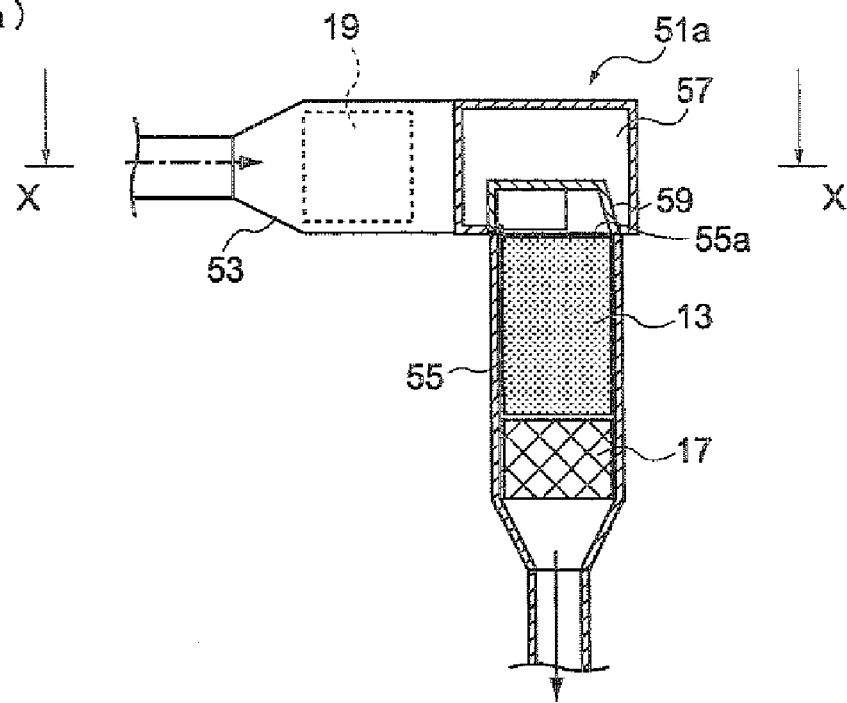
FIG. 9 shows views illustrating other examples of the configuration of an internal combustion engine exhaust gas purification apparatus that utilizes an L-shaped exhaust pipe.
Figure 9:
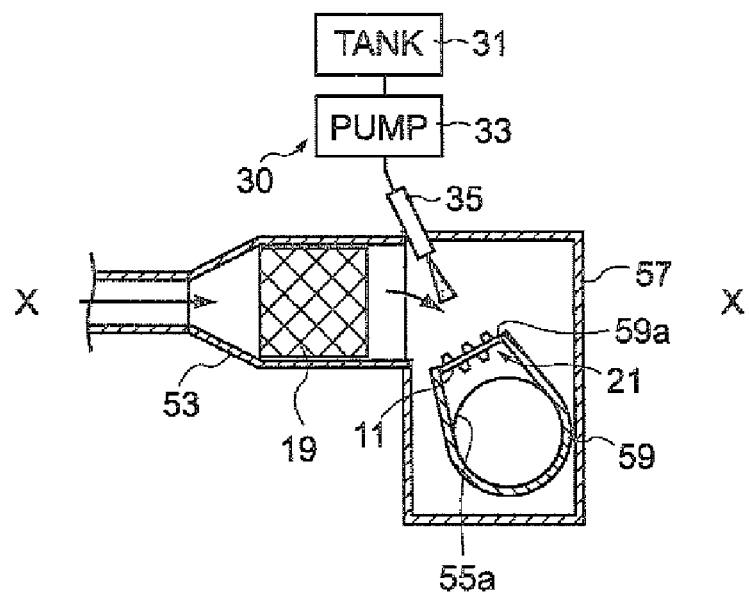

FIGS. 8 and 9 show configuration examples in the cases of an L-shaped exhaust pipe having a curved portion 51a between the upstream-side oxidation catalyst 19 and the $NO_x$ catalyst 13.

Among these, FIG. 8 shows the following example. An upstream-side exhaust pipe portion 53 in which the upstream-side oxidation catalyst 19 is disposed and a downstream-side exhaust pipe portion 55 in which the $NO_x$ catalyst 13 is disposed are in the same plane, and the tapered pipe 15 is connected to the entrance portion to the $NO_x$ catalyst 13 to thereby form the narrowed portion 21. The reducing agent diffusing means 11 is disposed on the narrowed portion 21, and the reducing agent injection valve 35 is fitted to a location in the curved portion 51a that faces the reducing agent diffusing means 11 so that the injecting direction is directed toward the reducing agent diffusing means 11.

FIGS. 9(a) to 9(b) show the following example. The upstream-side exhaust pipe portion 53 in which the upstream-side oxidation catalyst 19 is disposed and the downstream-side exhaust pipe portion 55 in which the $NO_x$ catalyst 13 is disposed exist in different planes. The upstream-side exhaust pipe portion 53 and the downstream-side exhaust pipe portion 55 are allowed to communicate with each other by a communication chamber 57. In this communication chamber 57, a guide member 59 is disposed so as to cover an entrance-side opening 55a of the downstream-side exhaust pipe portion 55. An exhaust gas inlet 59a provided in the guide member 59 has a tapering function with respect to the size of the communication chamber 57. The reducing agent diffusing means 11 is disposed on the exhaust gas inlet 59a serving as the narrowed portion 21, and the reducing agent injection valve 35 is fitted at a location that faces the reducing agent diffusing means 11 so that the injecting direction is directed toward the reducing agent diffusing means 11.

Note that FIG. 9(b) is a cross-sectional view taken along line X-X of FIG. 9(a), viewed in the direction of the arrows.

The guide member 59 is configured as follows. For example, as shown in FIGS. 10(a) and 10(b), a mounting face 59A thereof to the entrance-side opening of the downstream-side exhaust pipe portion is open, and a portion of its side face is open, whereby the exhaust gas inlet 59a is formed. It is configured so that the flow direction of the exhaust gas flowing in from the exhaust gas inlet 59a is guided to the mounting face 59A side, and to the downstream-side exhaust pipe portion. FIG. 10(a) is a perspective view showing the guide member 59 viewed from the mounting face 59A side, while FIG. 10(b) is a perspective view thereof viewed from the opposite side to the mounting face 59A.

Figure 10:
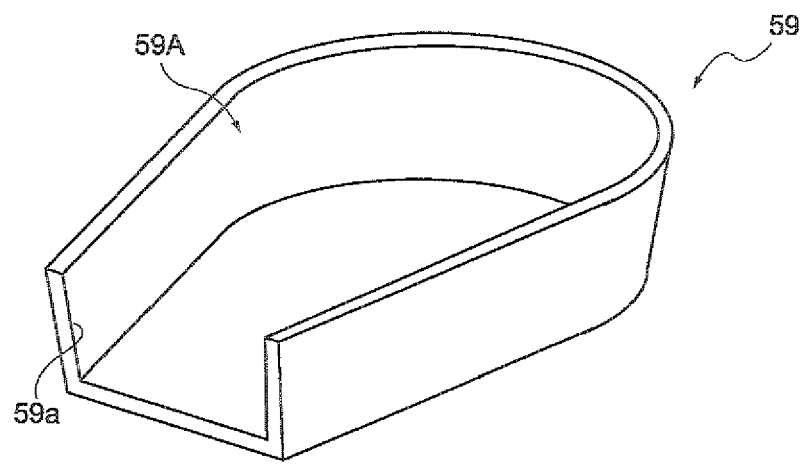
FIG. 10 shows views illustrating examples of the configuration of a guide member having a narrowed portion.
Figure 10:
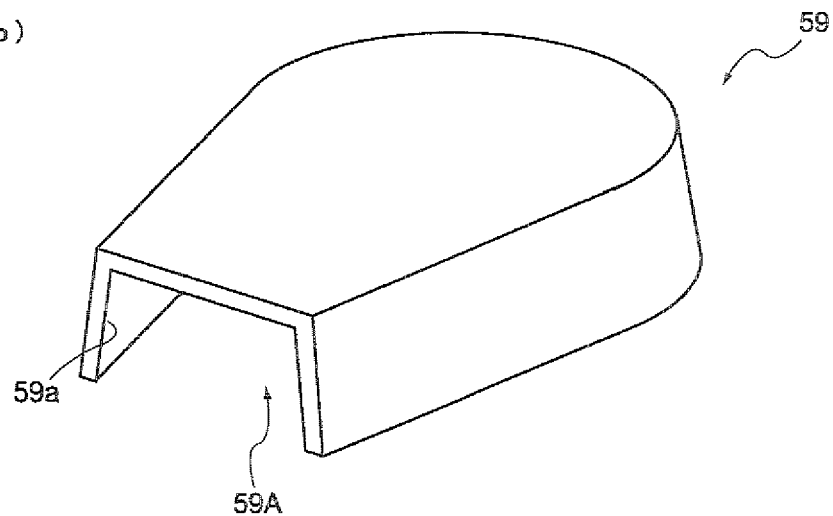

In the case of using the guide member 59 as shown in FIG. 10, the arrangement positions (orientations) of the exhaust gas inlet 59a of the guide member 59 and the reducing agent injection valve 35 may be selected as appropriate, as shown in FIGS. 11(a) through (c) and FIG. 12(a) and (b). However, it is preferable that they are set so that the exhaust gas can flow into the exhaust gas inlet 59a efficiently, taking the flow direction of the exhaust gas into consideration.

Figure 13:
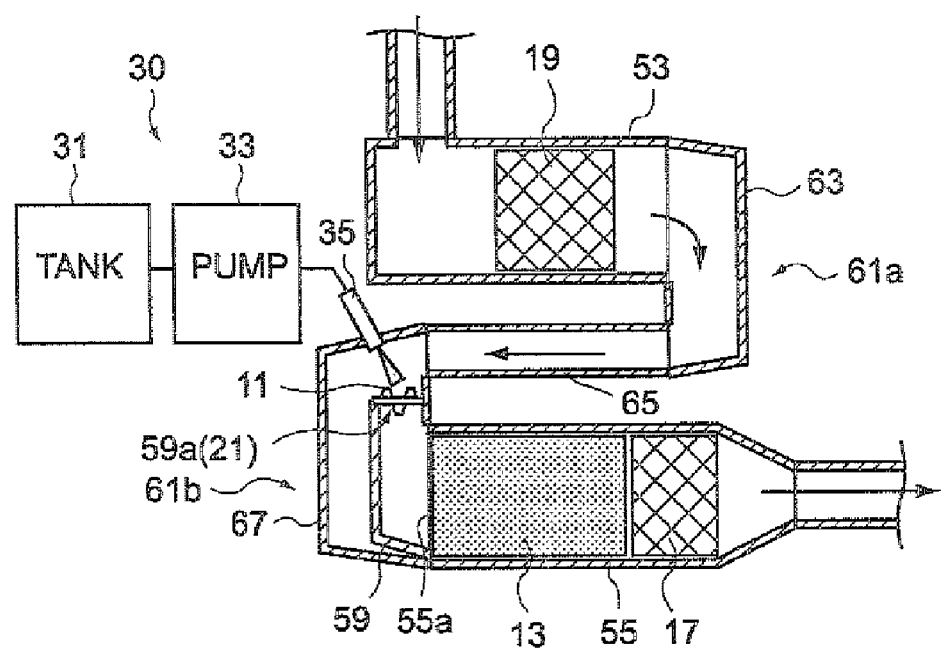
FIG. 13 is a view illustrating an example of the configuration of an internal combustion engine exhaust gas purification apparatus that utilizes a Z-shaped exhaust pipe.

FIG. 13 shows a configuration example in the case of a Z-shaped exhaust pipe having turning portions 61a and 61b on the downstream side of the upstream-side oxidation catalyst 19 and the upstream side of the $NO_x$ catalyst 13, respectively. In this example, the upstream-side exhaust pipe portion 53 in which the upstream-side oxidation catalyst 19 is disposed and the downstream-side exhaust pipe portion 55 in which the $NO_x$ catalyst 13 is disposed are allowed to communicate with each other via a first communication chamber 63, a joint pipe 65, and a second communication chamber 67. The upstream-side exhaust pipe portion 53, the downstream-side exhaust pipe portion 55, and the joint pipe 65 are placed on the same plane. The guide member 59 is disposed within the second communication chamber 67 so as to cover the entrance-side opening 55a of the downstream-side exhaust pipe portion 55. The exhaust gas inlet 59*a* provided in the guide member 59 has a tapering function with respect to the size of the second communication chamber 67. The reducing agent diffusing means 11 is disposed on the exhaust gas inlet port 59*a* serving as the narrowed portion 21, and the reducing agent injection valve 35 is fitted at a location that faces the reducing agent diffusing means 11 so that the injecting direction is directed toward the reducing agent diffusing means 11.

Figure 11:
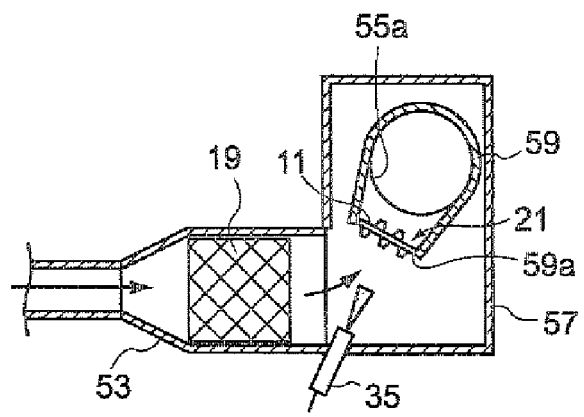
FIG. 11 shows views for illustrating arrangement positions of a reducing agent injection valve with respect to a guide portion.
Figure 11:
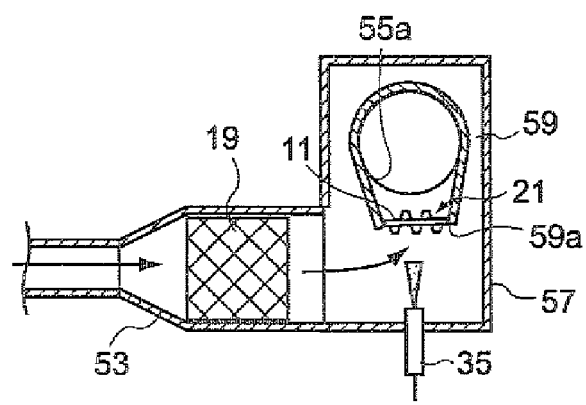
Figure 11:
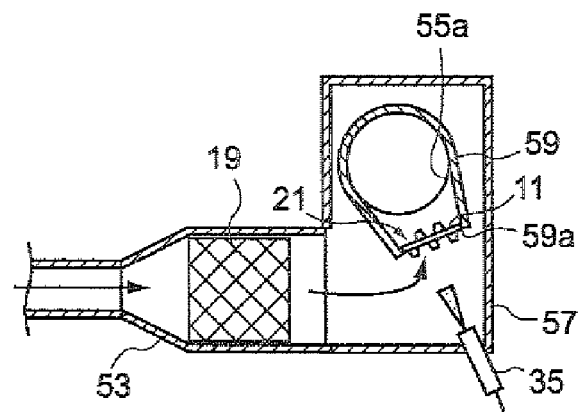
Figure 12A:
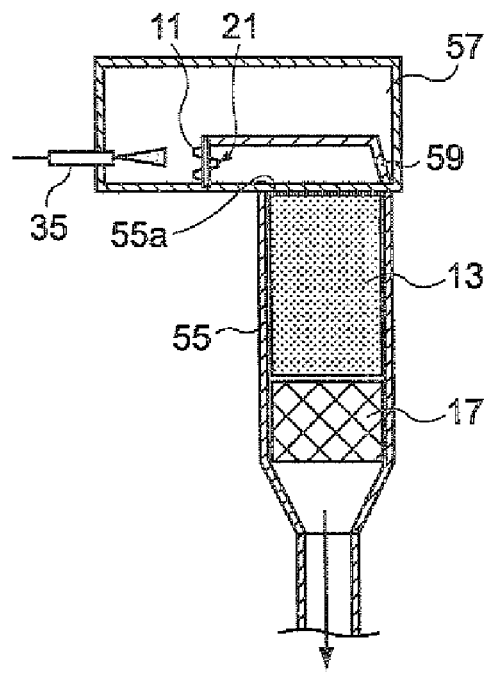
FIG. 12 shows views for illustrating other arrangement positions of the reducing agent injection valve with respect to the guide portion.
Figure 12B:
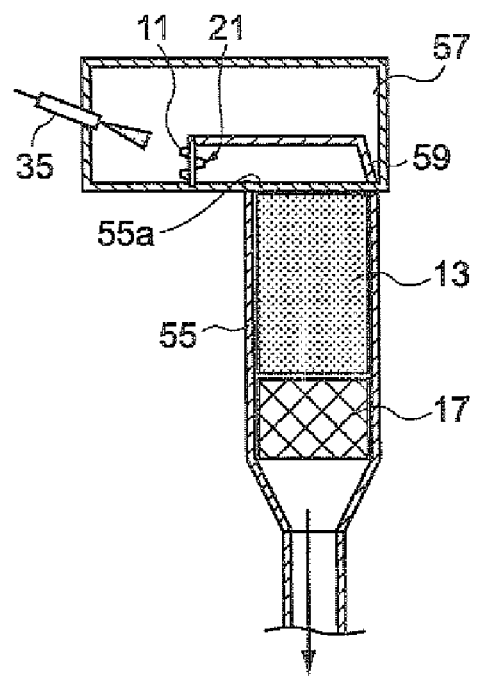

In the case of the configuration example of the Z-shaped exhaust pipe 61 shown in FIG. 13 as well, the arrangement position of the exhaust gas inlet 59*a* of the guide member 59 may be selected as appropriate as shown in FIGS. 11(*a*) to 11(*c*) and FIGS. 12(*a*) and 12(*b*).

Figure 14:
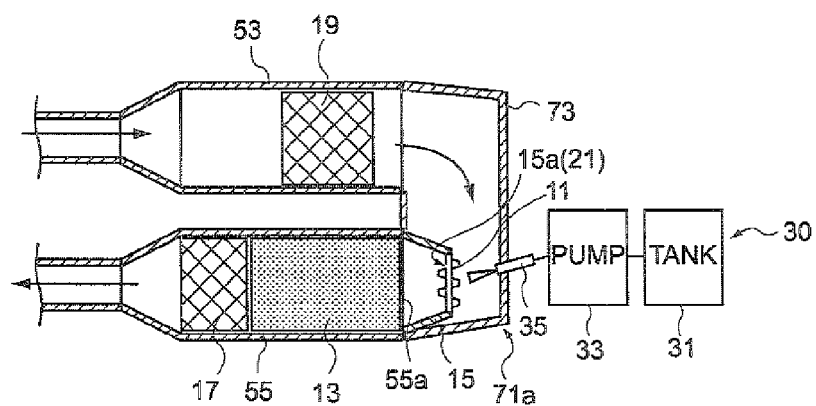
FIG. 14 is a view illustrating an example of the configuration of an internal combustion engine exhaust gas purification apparatus that utilizes a U-shaped exhaust pipe.
Figure 14:
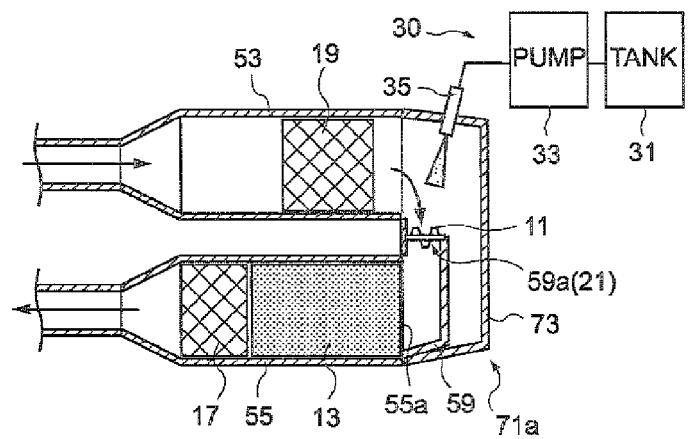
Figure 14:
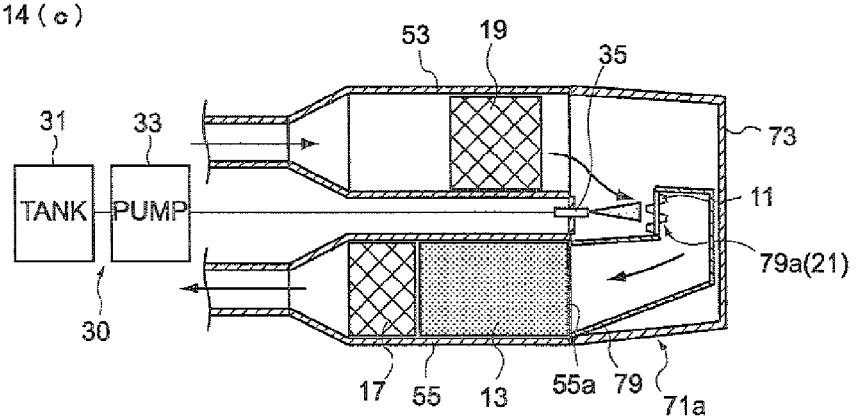

FIGS. 14(*a*) to 14(*c*) show configuration examples in the cases of an U-shaped exhaust pipe having a turning portion 71*a* between the upstream-side oxidation catalyst 19 and the $NO_x$ catalyst 13.

Among these, FIG. 14(*a*) shows the following example. The upstream-side exhaust pipe portion 53 in which the upstream-side oxidation catalyst 19 is disposed and the downstream-side exhaust pipe portion 55 in which the $NO_x$ catalyst 13 is disposed are allowed to communicate with each other by a communication chamber 73. The upstream-side exhaust pipe portion 53, the downstream-side exhaust pipe portion 55, and the communication chamber 73 are placed on the same plane. In the communication chamber 73, the tapered pipe 15 is connected to the entrance-side opening 55*a* of the downstream-side exhaust pipe portion 55 to thereby form the narrowed portion 21, and the reducing agent diffusing means 11 is disposed on the narrowed portion 21. The reducing agent injection valve 35 is fitted at the location that faces the reducing agent diffusing means 11 so that the injecting direction is directed toward the reducing agent diffusing means 11.

In the example of FIG. 14(*b*), the configuration of the U-shaped exhaust pipe is the same as that in FIG. 14(*a*), but the guide member 59 is disposed so as to cover the entrance-side opening 55*a* of the downstream-side exhaust pipe portion 55 within the communication chamber 73. The exhaust gas inlet 59*a* provided in the guide member 59 has a function as the narrowed portion 21. Also, the reducing agent diffusing means 11 is disposed on the narrowed portion 21. The reducing agent injection valve 35 is fitted at the location that faces the reducing agent diffusing means 11 so that the injecting direction is directed toward the reducing agent diffusing means 11.

In the example of FIG. 14(*c*), the configuration of the U-shaped exhaust pipe 71 is the same as that in FIG. 14(*a*). However, within the communication chamber 73, a guide member 79 is disposed so that it covers the entrance-side opening 55*a* of the downstream-side exhaust pipe portion 55 and an exhaust gas inlet 79*a* thereof faces inward of the U-shape. The exhaust gas inlet 79*a* provided in the guide member 79 has a function as the narrowed portion 21. Also, the reducing agent diffusing means 11 is disposed on the narrowed portion 21. The reducing agent injection valve 35 is fitted at the location that faces the reducing agent diffusing means 11 so that the injecting direction is directed toward the reducing agent diffusing means 11.

In the case of the configuration example of the U-shaped exhaust pipe 71 shown in FIGS. 14(*b*) and 14(*c*) as well, the arrangement position (orientation) of the exhaust gas inlet of the guide member may be selected as appropriate as shown in FIGS. 11(*a*) to 11(*c*) and FIGS. 12(*a*) and 12(*b*).

Figure 15:
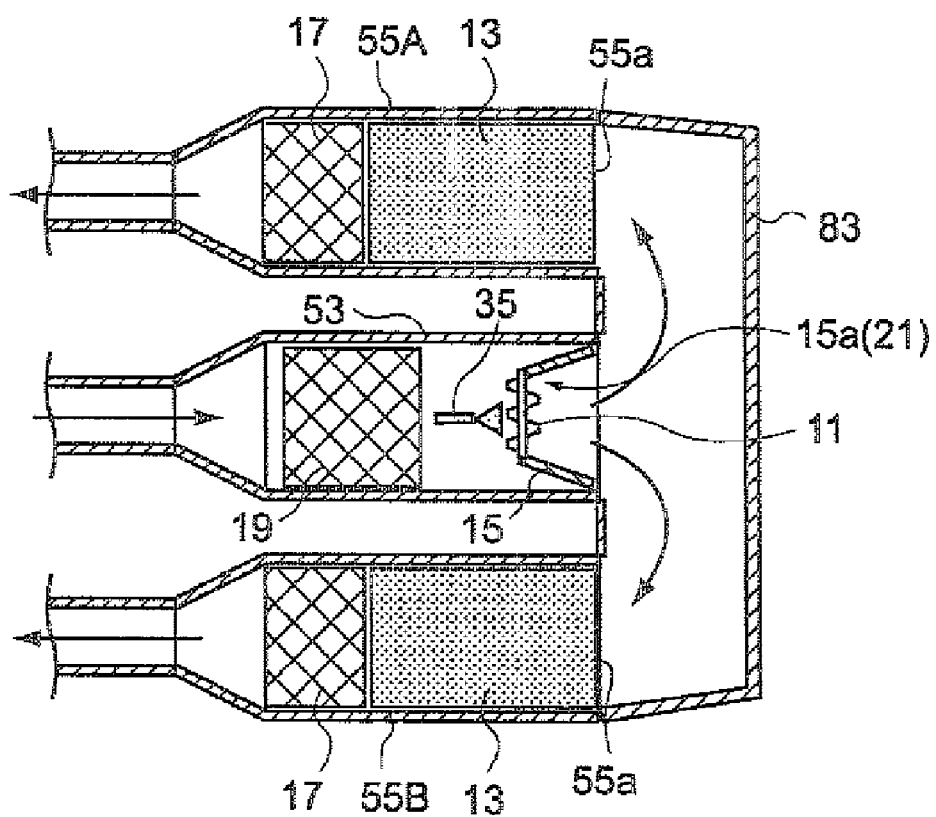
FIG. 15 is a view illustrating an example of the configuration of an internal combustion engine exhaust gas purification apparatus that utilizes a ψ-shaped exhaust pipe.
Figure 16:
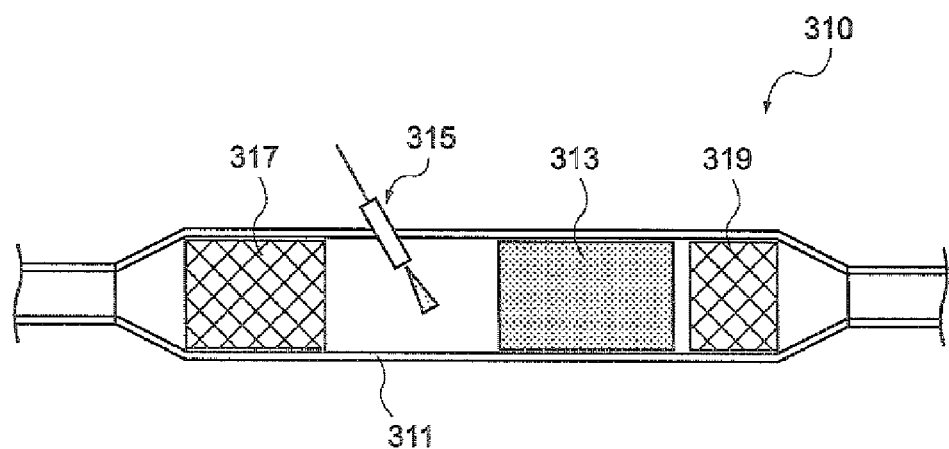
FIG. 16 is a view for illustrating the configuration of a conventional internal combustion engine exhaust gas purification apparatus.

FIG. 15 shows a configuration example in the case of a ψ-shaped exhaust pipe in which the exhaust gas passage is branched into two passages at a mid portion. In this example, the upstream-side exhaust pipe portion 53 in which the upstream-side oxidation catalyst 19 is disposed and two downstream-side exhaust pipe portions 55A and 55B that are disposed sandwiching the upstream-side exhaust pipe portion 53 at respective sides are allowed to communicate with each other by a communication chamber 83. All the exhaust pipe portions and the communication chamber are placed on the same plane. The tapered pipe 15 is connected to the outlet-side opening 53*a* of the upstream-side exhaust pipe that communicates with the communication chamber 83 portion 53 so as to form the narrowed portion 21, and the reducing agent diffusing means 11 is disposed on the narrowed portion 21. The reducing agent injection valve 35 is fitted at the location that faces the reducing agent diffusing means 11 so that the injecting direction is directed toward the reducing agent diffusing means 11.

Particularly, in the configurations in which the exhaust pipe has a turning portion as shown in FIGS. 13 to 15, the upstream-side oxidation catalyst 19, the $NO_x$ catalyst 13, and the downstream-side oxidation catalyst 17 are disposed at comparatively close locations to each other. Thereby, the size of the exhaust gas purification apparatus 10 can be made compact. At the same time, the heat retaining capability of the oxidation catalysts and the $NO_x$ catalyst can be enhanced, and the purification efficiency is increased.

Various modifications are possible in addition to the configuration examples illustrated above. However, even when any of the configurations is adopted, the reducing agent can be allowed to flow into the reducing agent diffusing means uniformly by fitting the reducing agent injection valve at the right opposite location that faces the reducing agent diffusing means so that the injecting direction is directed toward the reducing agent diffusing means. Moreover, since the reducing agent is not allowed to easily flow into the location other than the reducing agent diffusing means, the reducing agent is prevented from crystallizing or the like by adhering to the interior of the exhaust gas passage.

It should be noted that even when the $NO_x$ catalyst is a storage and reduction catalyst (NSC), HC fuel injecting means having a similar configuration as the above-described reducing agent injecting means may be provided in order to make the exhaust gas flowing into the $NO_x$ catalyst be in a rich condition. It is also possible to apply this invention to such an exhaust gas purification apparatus.

It is also possible to provide a particulate filter for collecting particulates in the exhaust gas between the upstream-side oxidation catalyst and the $NO_x$ catalyst. Alternatively, it is possible to provide a particulate filter on which an oxidation catalyst is coated in place of the upstream-side oxidation catalyst. When such a particulate filter is provided, it becomes possible to remove both particulates and $NO_x$ in the exhaust gas.

The invention claimed is:

1. An exhaust gas purification apparatus for an internal combustion engine, comprising:
    an $NO_x$ catalyst disposed in an exhaust gas passage of an internal combustion engine; and
    a reducing agent injecting unit, injecting a reducing agent into the exhaust gas passage which is on an upstream side of the $NO_x$ catalyst, wherein
    a narrowed portion, in which a cross-sectional area of a flow passage is smaller than a cross-sectional area of the exhaust gas passage and of the $NO_x$ catalyst, is provided on a downstream side of an injecting position by the reducing agent injecting unit and on the upstream side of the $NO_x$ catalyst,
    a reducing agent diffusing means formed using a metallic material which includes both a perforated plate having a plurality of flaps and a swirl type static mixer, or either, is provided on the narrowed portion, a downstream-side guide portion for guiding the exhaust gas to the $NO_x$ catalyst being provided between the narrowed portion and the $NO_x$ catalyst, an upstream-side guide portion for preventing the reducing agent from crystallizing by adhering to a location other than the narrowed portion being provided on an upstream side of the narrowed portion, and the exhaust gas passage having a curved section in the upstream side of the $NO_x$ catalyst, the downstream-side guide portion being fitted so as to cover an entrance of the $NO_x$ catalyst at the curved section and is provided with an exhaust gas inlet at a portion thereof, so that a flow direction of the exhaust gas that flows from the exhaust gas inlet into the downstream-side guide portion changes along the direction in which the exhaust gas passage curves.

2. The exhaust gas purification apparatus for an internal combustion engine according to claim 1, wherein the downstream-side guide portion is an expanding pipe in which the cross-sectional area thereof expands toward the downstream side.

3. The exhaust gas purification apparatus for an internal combustion engine according to claim 1, wherein the reducing agent injecting unit is disposed so that an injecting direction of the reducing agent is directed toward the reducing agent diffusing means.

4. The exhaust gas purification apparatus for an internal combustion engine according to claim 1, wherein the reducing agent injecting unit is disposed so that an injecting area of the injected reducing agent when reaching the narrowed portion does not spread outside the reducing agent diffusing means.

5. The exhaust gas purification apparatus for an internal combustion engine according to claim 1, wherein the perforated plate has a plurality of flaps which are formed by cutting and raising portions of the plate.

6. The exhaust gas purification apparatus for an internal combustion engine according to claim 1, wherein the swirl type static mixer forms a swirl passage by twisting one plate.

7. An exhaust gas purification apparatus for an internal combustion engine, comprising:

an $NO_x$ catalyst disposed in an exhaust gas passage of an internal combustion engine; and a reducing agent injecting unit, injecting a reducing agent into the exhaust gas passage which is on an upstream side of the $NO_x$ catalyst, wherein a narrowed portion, in which a cross-sectional area of a flow passage is smaller than a cross-sectional area of the exhaust gas passage and of the $NO_x$ catalyst, is provided on a downstream side of an injecting position by the reducing agent injecting unit and on the upstream side of the $NO_x$ catalyst, a first reducing agent diffusing means which is a perforated plate having a plurality of flaps formed using a metallic material is provided on the narrowed portion, a second reducing agent diffusing means which is a swirl type static mixer formed using a metallic material is provided on the downstream side from the narrowed portion, a downstream-side guide portion for guiding the exhaust gas to the $NO_x$ catalyst being provided between the narrowed portion and the $NO_x$ catalyst, an upstream-side guide portion for preventing the reducing agent from crystallizing by adhering to a location other than the narrowed portion being provided on the upstream side of the narrowed portion, and the exhaust gas passage having a curved section in the upstream side of the $NO_x$ catalyst, the downstream-side guide portion being fitted so as to cover an entrance of the $NO_x$ catalyst at the curved section and is provided with an exhaust gas inlet at a portion thereof, so that a flow direction of the exhaust gas that flows from the exhaust gas inlet into the downstream-side guide portion changes along the direction in which the exhaust gas passage curves.

8. The exhaust gas purification apparatus for an internal combustion engine according to claim 7, wherein the downstream-side guide portion is an expanding pipe in which the cross-sectional area thereof expands toward the downstream side.

9. The exhaust gas purification apparatus for an internal combustion engine according to claim 7, wherein the perforated plate has a plurality of flaps which are formed by cutting and raising portions of the plate.

10. The exhaust gas purification apparatus for an internal combustion engine according to claim 7, wherein the swirl type static mixer forms a swirl passage by twisting one plate.

11. The exhaust gas purification apparatus for an internal combustion engine according to claim 7, wherein the reducing agent injecting unit is disposed so that an injecting direction of the reducing agent is directed toward the reducing agent diffusing means.

12. The exhaust gas purification apparatus for an internal combustion engine according to claim 7, wherein the reducing agent injecting unit is disposed so that an injecting area of the injected reducing agent when reaching the narrowed portion does not spread outside the reducing agent diffusing means.

* * * * *